(12) United States Patent
Annan et al.

(10) Patent No.: US 9,921,574 B1
(45) Date of Patent: Mar. 20, 2018

(54) DYNAMIC INTERACTIVE ROBOT DIALOGUE CREATION INCORPORATING DISPARATE INFORMATION SOURCES AND COLLECTIVE FEEDBACK ANALYSIS

(71) Applicant: Sprint Communications Company L.P., Overland Park, KS (US)

(72) Inventors: Brandon C. Annan, Olathe, KS (US); Joshua Cole, Overland Park, KS (US); Deborah M. Gilbert, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 15/060,565

(22) Filed: Mar. 3, 2016

(51) Int. Cl.
| | |
|---|---|
| *G05B 19/18* | (2006.01) |
| *B25J 11/00* | (2006.01) |
| *G05B 19/4155* | (2006.01) |
| *H04L 29/08* | (2006.01) |
| *G06N 3/00* | (2006.01) |

(52) U.S. Cl.
CPC ....... *G05B 19/4155* (2013.01); *B25J 11/0005* (2013.01); *G06N 3/008* (2013.01); *H04L 67/306* (2013.01); *G05B 2219/40202* (2013.01)

(58) Field of Classification Search
CPC ...... G05B 19/4155; G05B 2219/39165; H04L 67/306; B25J 11/0005–11/0015; B25J 11/0003; G06N 3/02; G06N 3/008
See application file for complete search history.

(56) References Cited

U.S. PATENT DOCUMENTS

| | | |
|---|---|---|
| 8,463,720 B1 | 6/2013 | Seale et al. |
| 8,948,935 B1 | 2/2015 | Peeters et al. |
| 9,051,043 B1 | 6/2015 | Peeters et al. |
| 9,087,451 B1 | 7/2015 | Jarrell |
| 9,158,304 B2 | 10/2015 | Fleck |
| 9,213,931 B1 | 12/2015 | Annan et al. |
| 9,375,845 B1 | 6/2016 | Annan et al. |
| 9,529,359 B1 | 12/2016 | Annan et al. |
| 9,724,824 B1 | 8/2017 | Annan et al. |
| 2007/0156625 A1 | 7/2007 | Visel |
| 2007/0183604 A1 | 8/2007 | Araki et al. |
| 2007/0192910 A1* | 8/2007 | Vu .......................... B25J 5/007 700/245 |

(Continued)

OTHER PUBLICATIONS

Notice of Allowance dated Aug. 12, 2016, U.S. Appl. No. 14/592,677, filed Jan. 8, 2015.

(Continued)

*Primary Examiner* — Spencer D Patton

(57) ABSTRACT

A system and methods for incorporating disparate sources of collective feedback in the preparation and execution of an initial interaction between a social robot and a human being is disclosed. These methods include retrieving interaction content, assigning a life cycle to new content, detecting and removing expired life cycle content, modifying interaction scripts to include new interaction content and sending the modified interaction script to at least one social robot, wherein the at least one social robot executes the modified script during the period of time specified by the life cycle associated with the interaction topic to obtain an improved interaction with a human receiving, by the data management system, interaction log data.

20 Claims, 5 Drawing Sheets

(56) References Cited

U.S. PATENT DOCUMENTS

| | | | |
|---|---|---|---|
| 2007/0282765 A1 | 12/2007 | Visel et al. | |
| 2010/0023163 A1* | 1/2010 | Kidd | G05B 15/00 |
| | | | 700/245 |
| 2010/0298976 A1* | 11/2010 | Sugihara | A63H 11/20 |
| | | | 700/248 |
| 2011/0158470 A1 | 6/2011 | Martin et al. | |
| 2011/0296306 A1* | 12/2011 | Oddsson | G09B 5/06 |
| | | | 715/717 |
| 2012/0280087 A1 | 11/2012 | Coffman et al. | |
| 2013/0015236 A1 | 1/2013 | Porter et al. | |
| 2013/0126619 A1 | 5/2013 | Del Fiume et al. | |
| 2014/0277735 A1* | 9/2014 | Breazeal | B25J 11/0005 |
| | | | 700/259 |
| 2015/0341540 A1 | 11/2015 | Kim et al. | |
| 2015/0365159 A1 | 12/2015 | Bosworth | |
| 2016/0063987 A1 | 3/2016 | Xu et al. | |
| 2016/0093212 A1 | 3/2016 | Barfield, Jr. et al. | |
| 2016/0116912 A1 | 4/2016 | Nehmadi et al. | |

OTHER PUBLICATIONS

Restriction Requirement dated Dec. 7, 2015, U.S. Appl. No. 14/503,385, filed Sep. 30, 2014.
Notice of Allowance dated Feb. 16, 2016, U.S. Appl. No. 14/503,385, filed Sep. 30, 2014.
Notice of Allowance dated Jul. 30, 2015, U.S. Appl. No. 14/607,792, filed Jan. 28, 2015.
FAIPP Pre-Interview Communication dated Jan. 11, 2017, U.S. Appl. No. 14/794,765, filed Jul. 8, 2015.
Notice of Allowance dated Apr. 3, 2017, U.S. Appl. No. 14/794,765, filed Jul. 8, 2015.

* cited by examiner

DYNAMIC INTERACTIVE ROBOT DIALOGUE CREATION INCORPORATING DISPARATE INFORMATION SOURCES AND COLLECTIVE FEEDBACK ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Robots are electromechanical devices that are controlled by logic executed by the robot and may be autonomous or semi-autonomous. Robots have come to have widespread use in industry, for example in manufacturing automobiles. New applications for robots are emerging that involve robots interacting directly with human beings. Social robots may be used to augment teaching and may have particular efficacy in working with autistic children as well as in providing companionship to elderly persons who live alone.

SUMMARY

In an embodiment, a data management system is disclosed. The system comprises at least one processor, at least one non-transitory computer readable medium, and an application stored in the at least one non-transitory computer readable medium configured to retrieve interaction log data from a first social robot, analyze the interaction log data to identify interaction content eliciting a reaction from at least a first human exhibiting a characteristic and send, via a connection, an interaction content database to at least a second social robot, the interaction content database indicating that the interaction content is associated with the reaction from humans exhibiting the characteristic, wherein the interaction content database prompts the secondary social robot to adapt an interaction between the second social robot and a second human exhibiting the characteristic.

In an embodiment a method for data assembly by a data management system is disclosed. The method comprises receiving, by the data management system, interaction log data, detecting, by the data management system, a life cycle classification associated with an expired interaction content included in the interaction log data, gathering, based on the detection, new or updated interaction content matching the life cycle classification of the expired interaction content, modifying, by the data management system, at least one interaction script to include the new interaction content, and sending, by the data management system, the modified interaction script to at least one social robot, wherein the at least one social robot executes the modified interaction script to obtain an improved interaction with a human.

In an embodiment a method for data assembly by a data management system is disclosed. The method comprises retrieving interaction topics associated with at least one user profile characteristic from database resources, assigning a life cycle to the interaction content, identifying, interaction scripts associated with the at least one user profile characteristic, modifying, based on the identification, at least one interaction script to include the interaction content, and sending the modified interaction script to at least one social robot, wherein the at least one social robot executes the modified script during the period of time specified by the life cycle associated with the interaction topic to obtain an improved interaction with a human.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
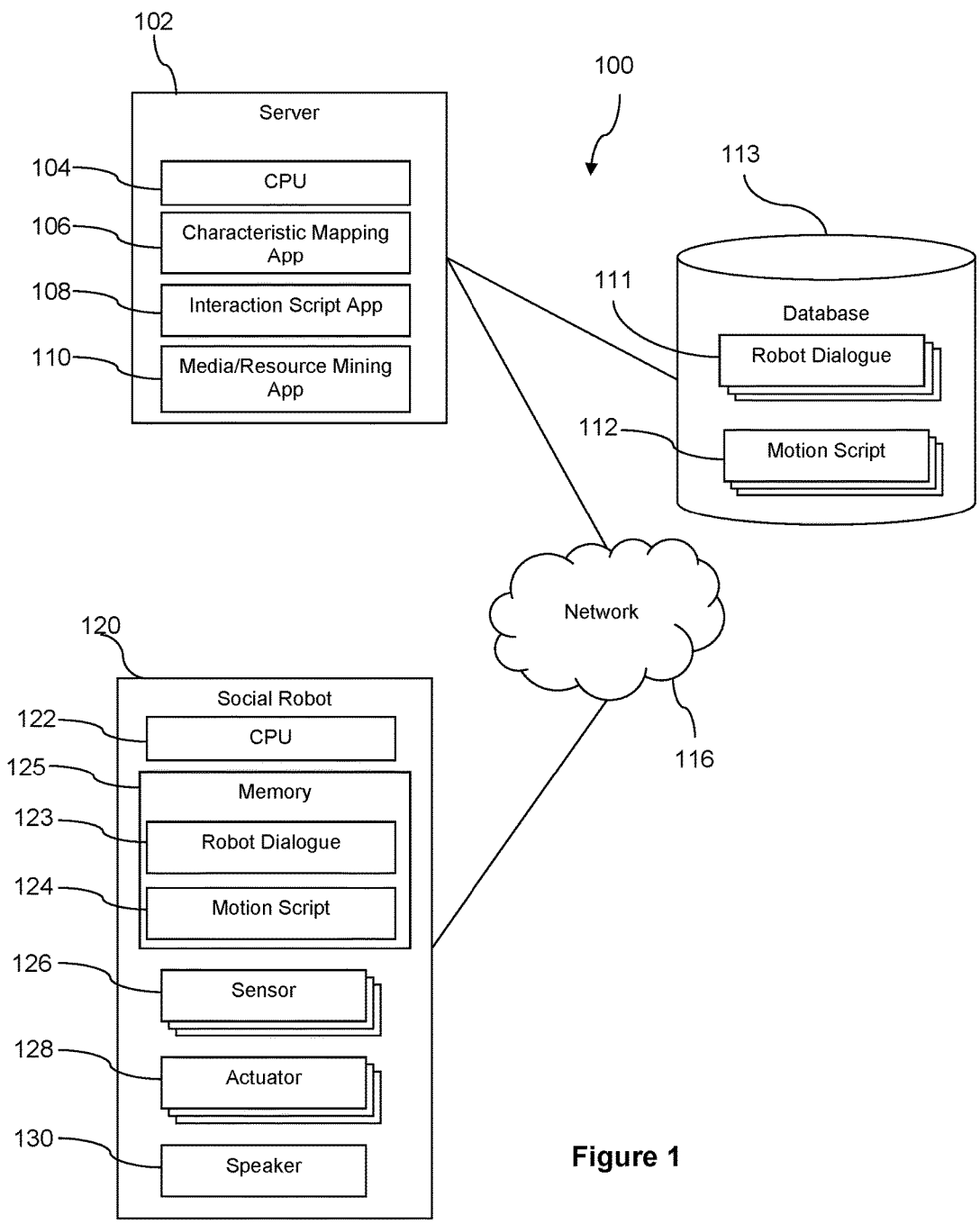
FIG. 1 is a block diagram of a data management system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Social robots may interact with people in a variety of different social and/or societal contexts. For example, social robots may provide companionship, motivation, and encouragement, as well as commiserate with people in times of loss. In some implementations, social robots may specialize in providing various forms of assistance to young, elderly, and/or disabled persons. For example, social robots may be used to encourage elderly persons to perform exercises to maintain mobility, flexibility, and general health. As another example, social robots may provide, or otherwise augment, teaching/coaching service to the young and/or disabled, e.g., autistic children, etc. Additionally, social robots may keep records of interactions with particular users in order to personalize, or otherwise improve, future interactions with those users, or with other users having similar characteristics or profiles. In this way, social robots may dynamically adapt their dialogue scripts from one interaction to another to enhance overall user experience.

The present disclosure teaches mechanisms for using interaction log data from one social robot to improve the social interactions of another social robot. In one embodiment, a data management system analyzes interaction log data retrieved from one or more social robots to generate an interaction content database. Content from the interaction content database is then sent to another social robot, where it is used to adapt an interaction between that social robot and a human being. The interaction content database may associate interaction content with human reactions. In one embodiment, the interaction content database is used to elicit positive reactions from users. For example, the data management system may analyze the interaction log data retrieved from a source social robot to identify interaction content (e.g., a local sports team) that elicits a positive reaction from a particular user exhibiting a profile (e.g., an adult male in a specific city). The data management system may then create an entry in the interaction content database indicating that the interaction content is associated with a positive reaction from users exhibiting the profile. The interaction content database may then be sent to a target social robot, which may bring up the interaction content when interacting with users having similar characteristics to the particular user's profile, e.g., other adult males in the same city. As discussed herein, the term "source social robot" refers to a social robot providing interaction log data, and the term "target social robot" refers to a social robot receiving content from an interaction content database. In another embodiment, the content received from interaction content database is used to avoid eliciting negative reactions from users. In such an embodiment, the interaction content database may associate interaction content (e.g., an uninteresting topic) with a negative reaction (e.g., boredom, etc.) from users exhibiting a profile. By way of example, an interaction content database may indicate that adolescent children tend to be uninterested in topics related to art history.

With the present disclosure a social robot may identify a characteristic of a human to be interacted with, access content received from an interaction content database, select a conversation topic from the content that has previously attained a positive reaction from similar humans and use the selected topic to build an initial interaction dialogue script to obtain an improved initial interaction with the human. In an embodiment, the interaction content database may be a database of collective feedback from other social robots' interactions matching a human sharing the identified characteristic. In an embodiment the positive reaction may be associated with a threshold rating of positive reactions based on previous use by other social robots or other varying degrees of positive classifications of reactions. Establishing a positive initial interaction may help to encourage a person to incorporate something as new and different as a social robot into his or her daily life, as people having enjoyable experiences with the social robot, early on may be more likely to continue interaction with the social robot and/or incorporate the social robot into their everyday lives.

Selecting an initial conversation topic for an interaction between a social robot and a new user can be accomplished in a number of ways. In an embodiment, a social robot may incorporate disparate information sources similar to the opportunities a human would have access to in the form of a data management system containing the collective feedback of its peers. Having access to a centralized well of information and experiences, trials and errors of other social robots, is beneficial and time-saving. In an embodiment, a social robot could, without having to use its own resources or engender a negative reaction from the human it would like to interact with, observe that the human is wearing a New York sports team shirt. The robot may then access the interaction content database and discover that humans wearing New York sports team memorabilia are usually fans of that particular sports team and an initial interaction beginning with a reference to a recent news story on the star athlete's drug rehab visit may not elicit a positive reaction. Whereas, without this information, the robot may have observed the New York sports team shirt and recited an interaction script matching the sports team without further access to a superior level of feedback from disparate sources thus resulting in a negative reaction and losing the opportunity to engender a positive first interaction.

Artificial intelligence attempting to interact with humans on an interpersonal level may entail multiple layers of interpretation, logic, and probability factoring. Using the resources of a plurality of social robot interactions filtered and/or analyzed by a centralized data management system to create an interaction content database may allow for the application of more layers of probability deduction and reasoning through use-case scenarios. The human mind filters using a similar process called mirroring, where a reaction is observed and a human brain interprets the reaction by asking himself what would make him make the same reaction: why would he smile? He would smile if he was happy, thus the person who is smiling must be happy. Since robots cannot react to make a mirroring judgment a large number of human reactions can be recorded, filtered through identifiers to narrow matching human profiles and weighed against probability algorithms to achieve the same effective process.

In an embodiment, interactions that social robots have experienced are recorded and reported to a central data management system which may analyze the interaction log data for interaction content and user profile information as well as the success rate of the content presented to each human. Interaction content may be considered successful if it was reported that the content, when used by a social robot, received a positive reaction. A statistical analysis system may be imposed to assess the success rates of content against various user profiles or use cases. The system may assign a probability of success for future use and then filter content with past success rates or probability rates of future success which do not meet a specified threshold for inclusion in the content database. For example, if an interaction content is not assigned to have a 75% or greater probability of success with a specific profile group, it may not be included in that profile group database of interaction content.

Interaction content may also be assigned classifications, keywords, and life cycles as it is entered into the database for use by other robots in interaction templates and scripts. The life cycle information may provide several benefits. A life cycle is a period of time that the robot is allowed to use any given piece of interaction content. The content may be a joke, a news topic, a blog article, or any piece of information that is used to start a conversation. In an embodiment, the life cycle may be determined by the type of content or by a success-use algorithm. For example, if the interaction content is an online blog related to a popular television show, the life cycle may relate to the current running season of new episodes. After the current television season is over, the life cycle would end and the content would be removed from the interaction script queue. Similarly, an embodiment may include an awards season or a fashion season where the life cycle is determined by the span of time surrounding a specific award show or fashion event and would include the weeks prior to the event and end at the conclusion of the fashion or award event.

In another embodiment, a news feed may follow injuries of athletes in a specific sport where the life cycle for that news media source would be the length of the season and post-season for that particular sport. For example an American football season may span from the pre-season games in August to the Super Bowl game in late January. In another embodiment, news outlets may be streamed for content regarding a political election where the life cycle for any content would be the length of a particular election season spanning from pre-election party-affiliated caucuses to Election Day. After the election has concluded the robot would recognize an expired life cycle of the interaction content and any corresponding interaction scripts would be modified or removed from queue. The user profile information may be physical data about the human interaction with the social robot such as hair color, eye color, height, or weight. However, the user profile information may also be any data relating to the human user such as the human's vocation, age, race, gender, education level, political affiliation, sexual orientation, a personal preference, a buying habit, a sleeping habit or any other information which may be useful to identify the human or content which might elicit a response from the human during an interaction with a social robot. The success rate of the interaction content presented by a social robot may be qualified by whether or not the material was able to elicit a response at all from the human, or success may be defined as specifically eliciting a positive or negative reaction. Once the data management system has assembled a database of interaction content relevant to a particular characteristic or profile which has specific reaction classification, it will send content from the database to at least a second social robot associated with a second human of a similar user profile or who exhibits the characteristic of the database which will prompt the second social robot to adapt interactions with the second human to obtain improved interactions.

In an embodiment a team of operators (e.g., operators employed by a company selling or manufacturing the social robots) may craft robot dialogues and propagate the dialogues out to a community of social robots or a selection of members of a community of social robots. The results of the social robots initiating conversations with these dialogues with human beings can be harvested and analyzed to determine if the dialogues were well received and/or what profiles of human beings the dialogues worked with and what profiles of human beings the dialogues did not work well with. The social robots that are selected for testing newly crafted robot dialogues can be changed over time to reduce the conversational gaffs or dead-end dialogue starters experienced by any one human being-social robot couple. This can be an ongoing process for keeping the interaction content database evergreen and up on current events. The harvested and processed information can then be distributed to the entire community of social robots.

The team of operators may craft some of the robot dialogues according to formulas or templates that have been found to be useful for composing introductory robot dialogues. For example, formulas or templates may have a form such as "What did you think about {substitute local sports team} {substitute action: win/loss, releasing/acquiring, drafting} {substitute: time}?" These robot dialogues can be crafted based on the formulas or templates but taking advantage of knowledge of recent news. Some formulas may leave out some associated information and reserve that for a follow-up question. "What was the team they played, again, I forget?" The team of operators may deliberately create minor variations of robot dialogues approximately fitting the same template to test on a selection of members of the community of social robots to converge on the best variant.

A script may be used that receives inputs from various current events and/or current information feeds and automatically generates trial robot dialogues based on predefined formulas or templates. Feeds could include weather feeds, news feeds, sports scores, sports reports, political updates, arts events, public event schedules, on-line newspaper articles. The script could scan these feeds to find information to build dialogues according to formulas or templates. In an embodiment, different script may be associated with each different feed.

The results from social robot dialogue usage may be used for other purposes beyond promoting companionship or learning for the human being associated with the robot. In an embodiment, the reactions of the human interlocutor's may be harvested to determine interest in products, movies, music, political candidates, political issues, and the like.

It should be noted that not every negative reaction by a human interlocutor would or should be interpreted to indicate the social robot dialogue is ill-suited to that human being and/or to a human being having a similar profile. It may be that anger or passion exhibited by the human interlocutor can be an indication of the power of the subject dialogue to engage the human being. Analysis of direct and indirect feedback from the human being may be analyzed to evaluate the suitability and desirability of reusing the subject dialogue with another similar human being. Indirect feedback might include things like the duration of time that the human being speaks, the rapidity with which the human being speaks. The social robot can also directly query the human interlocutor if he or she enjoyed that discussion and if the human would like the robot to bring up similar topics of conversation in the future.

Turning to FIG. 1, a data management system 100 is illustrated according to an embodiment of the disclosure. In an embodiment the data management system 100 comprises a central server 102 connected through a network 116 to a social robot 120. The server 102 may comprise a central processing unit (CPU) 104, a characteristic mapping application 106, an interaction script application 108, a media or resource mining application 110, and storages containing archives of robot dialogue 111 and motion scripts 112 such as database 113. The server 102 may also contain other applications or storage as necessary or convenient for the purpose of managing data related to the execution of interactions between social robots and humans. The social robot 120 comprises a CPU 122, dialogue 123 and motion scripts 124 stored in a memory 125, a plurality of sensors 126 and actuators 128, and at least one speaker 130. In an embodiment, the social robot 120 collects data through interactions with humans or by observing the interactions of at least one human with other stimuli and sends the data through the network 116 to the server 102 for processing. The server 102 may sort the incoming data according to content, source, or other identifiers included in the interaction log data and apply characteristic mapping application 106 to the data to find similar interaction log data inside the database 113.

In an embodiment data mining application 110 is utilized to pull content from data streams via network 116, such as online news media, social media, personal blogs, and other resources that matches profiles, life cycles, or interaction content data for assimilation into interaction templates. For example, the interaction script application 108 alerts the data base 113 that content with a life-cycle associated with a specific television season is about to expire. The media or resource mining application 110 will access various media outlets online via the network 116 to find new content associated with the next television season life cycle to replace the expiring content and can match other profile characteristics such as the type of television series ending, other similar shows that might be of interest, or premieres of brand new shows that might interest the human. In an embodiment a television season may be a span of previously unaired episodes airing in scheduled succession.

In an embodiment, allowing the social robot 120 to observe in a neutral, or data collection mode allows for the assembly and collection of conversational topics, gambits, and data for analysis by the server 102. The server 102 may be maintained by a manufacturer or other entity other than the owner of the social robot. In an embodiment, the social robot 120 observes and collects visual data as the human watches a television show and displays positive reactions (i.e., laughter, smiles) to jokes and situations in the plot of the show. The social robot 120 would report the visual data to the central database 113 or facility for analysis and repurposing. Once the data has been assimilated, e.g., processed to create and store dialogue scripts and/or motion scripts indexed by a human profile or characteristic, the jokes or situational conversation may be utilized in dialogue scripts 111 or motion scripts 112 available for the social robot 120 to retrieve and use effectively with the human who has shown a positive reaction to this type of comedy. For example, if a human were observed enjoying the show Seinfeld, and then later engaging in a conversation with the social robot, the robot may recognize an opportunity to insert, "No soup for you!" instead of a simple "No" or other admonishment in the normal course of the conversation, which may elicit a positive reaction and allow for a more personalized experience. This allows the robot to develop and associate humor and inside jokes with the human in a similar fashion to a companion who would ordinarily require a long-standing relationship to develop such repertoire.

Figure 2:
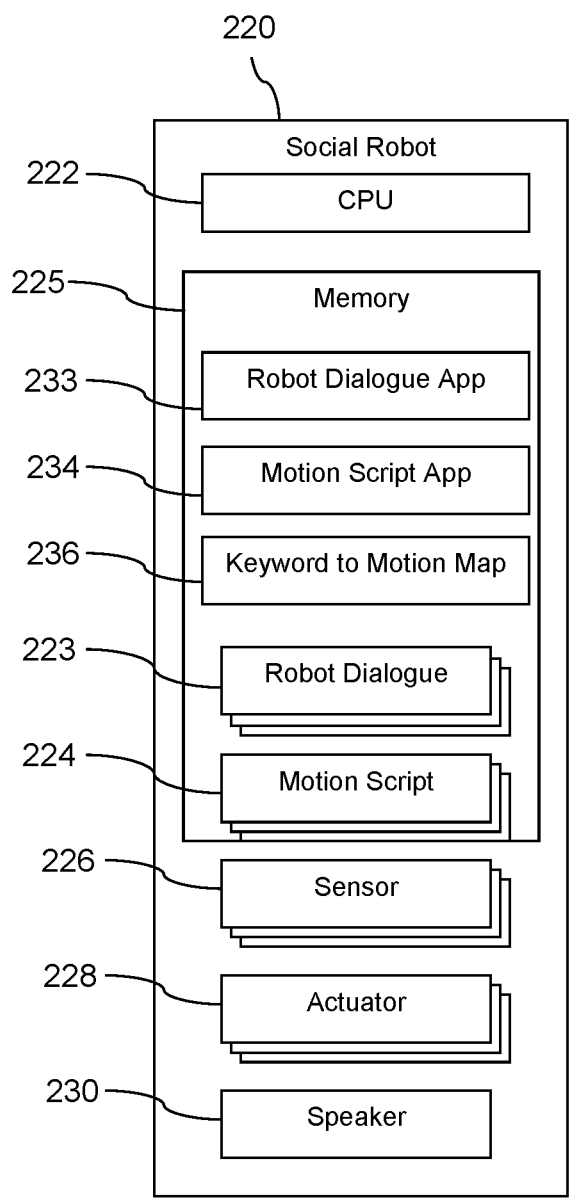
FIG. 2 is a block diagram of a social robot according to an embodiment of the disclosure.

Turning to FIG. 2, a social robot 220 is described. Some of the features of the second social robot 220 may be similar to those of the social robot 120. For example, central processing unit (CPU) 222, memory 225, actuator 228 and speaker 230. Additionally, some of the use scenarios described above may be applicable to the second social robot 220. For example, the social robot 220 may identify a human using data collected from sensors 226. Based on this identification, the social robot 220 may utilize features of a robot dialogue application 233, motion script application 234 to access dialogue or motion script templates downloaded from a database to initiate an interaction with the identified human. In another embodiment the social robot 220 will select specific robot dialogues 223 and motion scripts 224 from a store already existing in the social robot 220 memory to initiate an interaction and may utilize a keyword to motion app 236 to unify and integrate the two sources of input into a single synchronous interaction output.

Figure 3:
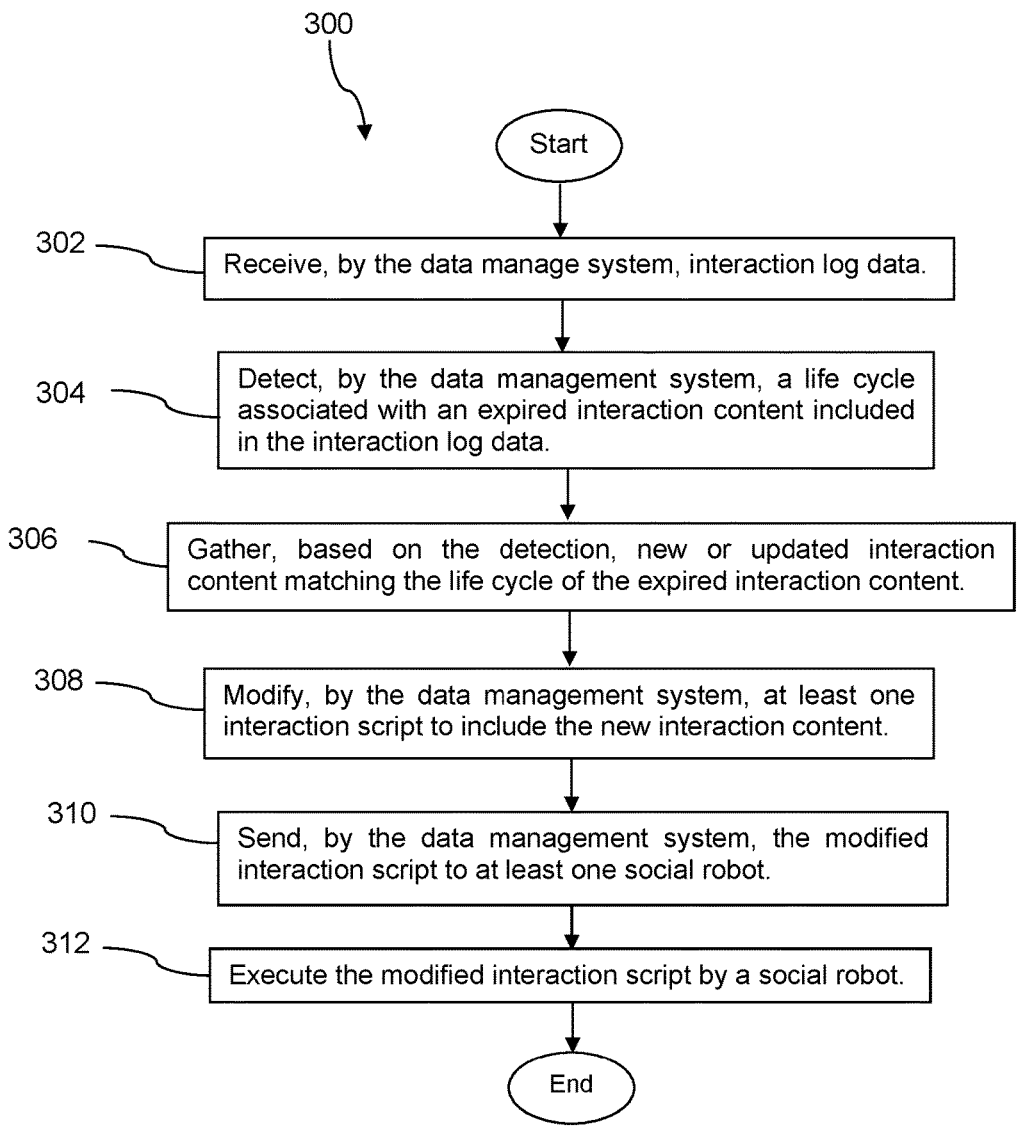
FIG. 3 is a flow chart of a method according to an embodiment of the disclosure.

Turning to FIG. 3, a method 300 is described. At block 302, the data management system receives interaction log data. At block 304 the data management system detects a life cycle associated with an expired interaction content included in the interaction log data. At block 306, the data management system gathers new or updated interaction content matching the life cycle of the expired interaction content based on the detection of the life cycle. At block 308, the data management system modifies at least one interaction script to include the new interaction content. At block 310, the data management system sends the modified interaction script to at least one social robot. At 312, the social robot executes the modified interaction script to obtain an improved interaction with a human.

Figure 4:
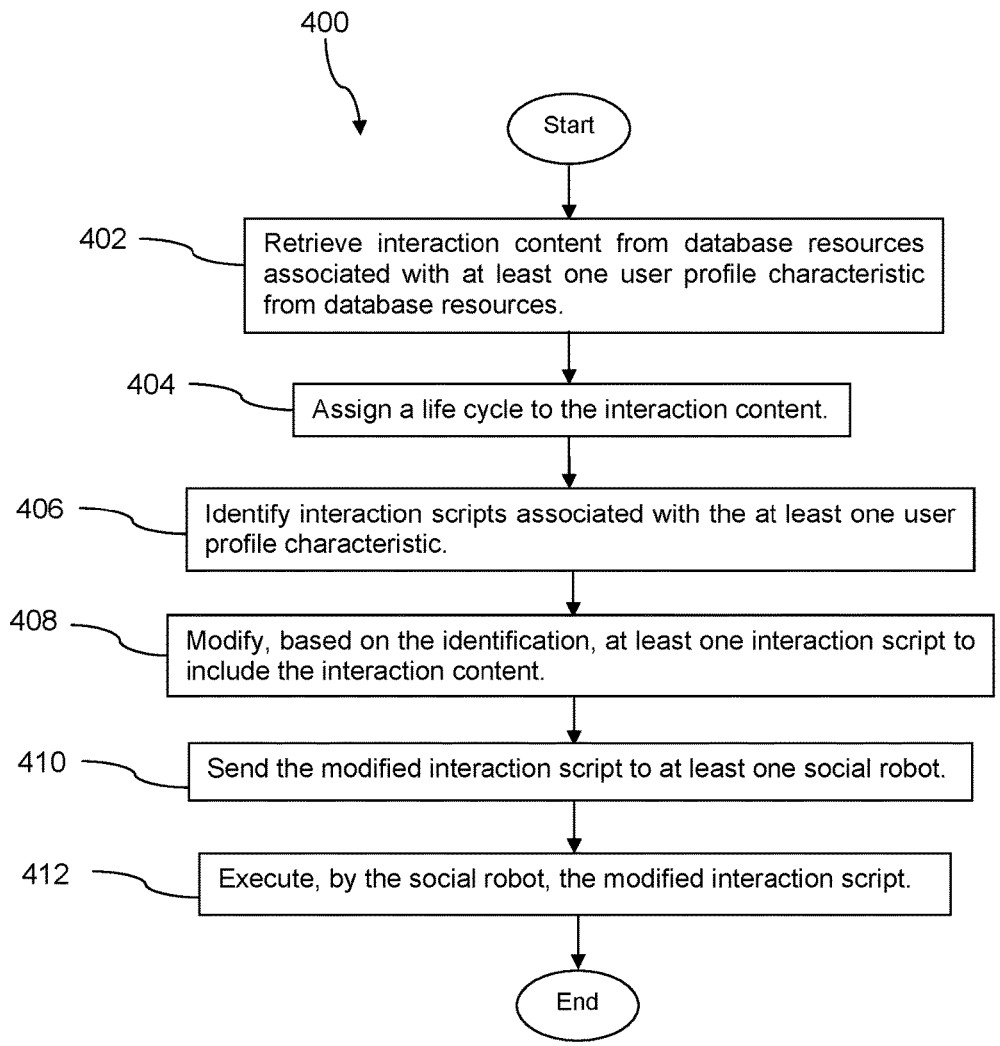
FIG. 4 is a flow chart of a method according to another embodiment of the disclosure.

Turning to FIG. 4, a method 400 is described. At block 402, the data management system retrieves interaction content from database resources. At block 404, the data management system assigns a life cycle to the interaction content. At block 406, the data management system identifies interaction scripts associated with the at least one user profile characteristic. At block 408, the data management system modifies, based on the identification, at least one identification script associated with the at least one user profile characteristic to include the retrieved interaction content. At block 410, the data management system sends the modified interaction script to at least one social robot. At block 412, the at least one social robot executes the modified interaction script to obtain an improved interaction with a human.

Figure 5:
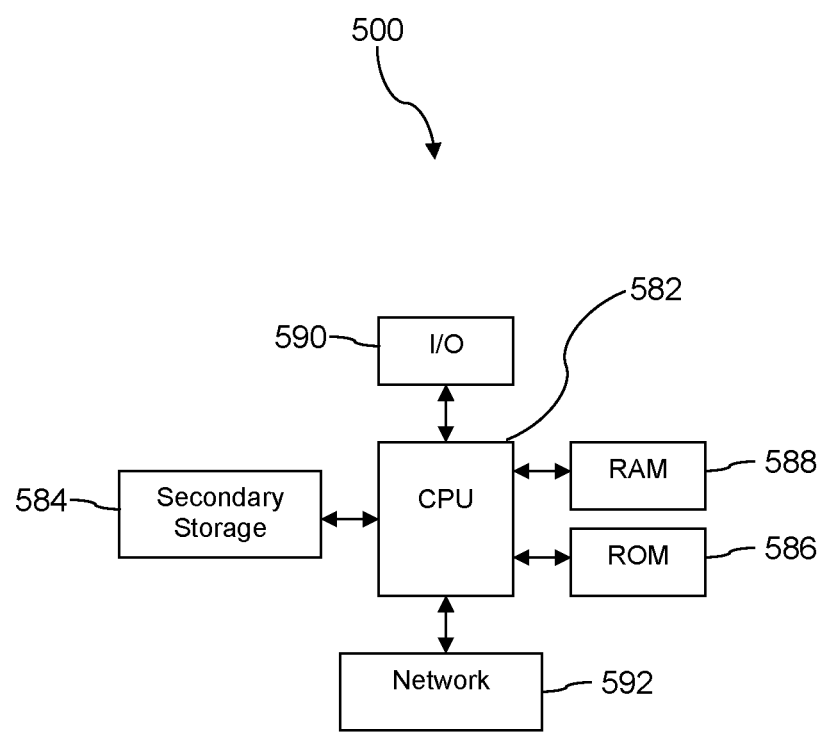
FIG. 5 illustrates an exemplary computer system suitable for implementing the several embodiments of the disclosure.

FIG. 5 illustrates a computer system 500 suitable for implementing one or more embodiments disclosed herein. The computer system 500 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 580 is turned on or booted, the CPU 582 may execute a computer program or application. For example, the CPU 582 may execute software or firmware stored in the ROM 586 or stored in the RAM 588. In some cases, on boot and/or when the application is initiated, the CPU 582 may copy the application or portions of the application from the secondary storage 584 to the RAM 588 or to memory space within the CPU 582 itself, and the CPU 582 may then execute instructions that the application is comprised of. In some cases, the CPU 582 may copy the application or portions of the application from memory accessed via the network connectivity devices 592 or via the I/O devices 590 to the RAM 588 or to memory space within the CPU 582, and the CPU 582 may then execute instructions that the application is comprised of. During execution, an application may load instructions into the CPU 582, for example load some of the instructions of the application into a cache of the CPU 582. In some contexts, an application that is executed may be said to configure the CPU 582 to do something, e.g., to configure the CPU 582 to perform the function or functions promoted by the subject application. When the CPU 582 is configured in this way by the application, the CPU 582 becomes a specific purpose computer or a specific purpose machine.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), flash drive, ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 584, to the ROM 586, to the RAM 588, and/or to other non-volatile memory and volatile memory of the computer system 500. The processor 582 may process the executable instructions and/or data structures in part by directly accessing the computer program product, for example by reading from a CD-ROM disk inserted into a disk drive peripheral of the computer system 500. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 500.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data management system comprising:
   at least one processor;
   at least one non-transitory computer readable medium;
   an application stored in the at least one non-transitory computer readable medium configured to:
   retrieve interaction log data from a first social robot, the interaction log data describing interaction content of a dialog interaction between a first human and the first social robot;
   analyze the interaction log data to identify interaction content eliciting a reaction from at least the first human exhibiting a characteristic;
   detecting a life cycle associated with the interaction content included in the interaction log data, wherein the life cycle is a period of time that a social robot is allowed to use a given piece of interaction content; and
   send an interaction content database to at least a second social robot, the interaction content database indicating that the interaction content is associated with the reaction from humans exhibiting the characteristic,
   wherein the interaction content database prompts the secondary social robot to adapt an interaction between the second social robot and a second human exhibiting the characteristic according to an interaction script detailing a portion of the interaction content that elicited a positive reaction during an interaction between the first social robot and the first human for use by the second social robot in interacting with the second human during the life cycle of the interaction content.

2. The system of claim 1, wherein the characteristic is an entry in a user profile or a classification of the interaction.

3. The system of claim 2, wherein the entry in the user profile is one or more of a vocation, an age, a physical trait, a race, a gender, an education level, a political affiliation, a sexual orientation, and a personal preference.

4. The system of claim 1, wherein the interaction content database indicates that the portion of the interaction content elicits a positive reaction from humans exhibiting the characteristic and prompts the second robot to include the interaction content during an interaction between the second social robot and the second human.

5. The system of claim 1, wherein the interaction content database indicates that a second portion of the interaction content elicits a negative reaction from humans exhibiting the characteristic and prompts the second social robot to exclude the second portion of the interaction content during an interaction between the second social robot and the second human.

6. A method of data assembly by a data management system comprising:
   receiving, by the data management system, interaction log data describing interaction content of a dialog interaction between a first human and a first social robot;
   detecting, by the data management system, a life cycle associated with an expired interaction content included in the interaction log data, wherein the life cycle is a period of time that a social robot is allowed to use a given piece of interaction content, and wherein the expired interaction content is interaction content that the social robot is no longer allowed to use;
   gathering, based on the detection, new or updated interaction content based on the life cycle of the expired interaction content;
   modifying, by the data management system, at least one interaction script to include the new interaction content, wherein the interaction script details a portion of the interaction content that elicited a positive reaction during an interaction between the first social robot and the first human for use by at least a second social robot in interacting with a second human; and
   sending, by the data management system, the modified interaction script to the second social robot;
   wherein the second social robot executes the modified interaction script to obtain an improved interaction with the second human.

7. The method of claim 6, wherein the interaction log data comprises a classification of the interaction and at least one characteristic of the first human.

8. The method of claim 7, wherein the characteristic of the first human is at least one of a vocation, an age, a physical trait, a race, a gender, an education level, a political affiliation, a sexual orientation or a personal preference.

9. The method of claim 6, wherein the first social robot assembles interaction log data mapped to interaction scripts executed by the first social robot during an interaction with the first human comprising the classification of the interaction and the at least one characteristic of the human and sends the interaction log data to a data management system.

10. The method of claim 6, wherein the life cycle is a sports season, political season, a television season, an awards season, or a number of times to be used.

11. The method of claim 6, wherein the life cycle is a specific date range.

12. The method of claim 6, wherein the life cycle includes a number of instances in which the expired interaction content was brought up during an interaction with a specific human.

13. A method of data assembly by a data management system comprising:
retrieving interaction content associated with a dialog interaction between a first human and a first social robot and at least one user profile characteristic from database resources;
assigning a life cycle to the interaction content, wherein the life cycle is a period of time the interaction content is to remain accessible within the system;
identifying interaction scripts associated with the at least one user profile characteristic;
modifying, based on the identification, at least one interaction script to include the interaction content, wherein the interaction script details a portion of the interaction content that elicited a positive reaction during an interaction between the first social robot and the first human for use by at least a second social robot in interacting with a second human; and
sending the modified interaction script to the second social robot,
wherein the second social robot executes the modified script during the period of time specified by the life cycle associated with the interaction content to obtain an improved interaction with the second human.

14. The method of claim 13, wherein the database resources are at least one of: news feeds, media feeds, sports feeds, or social media outlets.

15. The method of claim 13, wherein the life cycle is a duration of a sports season, political season, television season, awards season, or number of times to be used.

16. The method of claim 13, wherein the life cycle is a specific date range.

17. The method of claim 13, wherein the user profile characteristic is one or more of a vocation, an age, a physical trait, a race, a gender, an education level, a political affiliation, a sexual orientation, and a personal preference.

18. The method of claim 13, wherein the first social robot assembles interaction log data mapped to interaction scripts executed by the first social robot during an interaction with the first human comprising a classification of the interaction and at least one characteristic of the first human and sends the interaction log data to a data management system.

19. The method of claim 13, wherein the database resources are observed data retrieved from a remote device.

20. The method of claim 13, wherein identifying the interaction script comprises selecting scripts which exceed a threshold level of positive interaction based on the associated characteristic.

* * * * *